US012646654B2

(12) United States Patent
Kim et al.

(10) Patent No.: US 12,646,654 B2
(45) Date of Patent: Jun. 2, 2026

(54) DIELECTRIC COMPOSITION AND MULTILAYER CAPACITOR

(71) Applicant: SAMSUNG ELECTRO-MECHANICS CO., LTD., Suwon-si (KR)

(72) Inventors: Hyoung Uk Kim, Suwon-si (KR); Jae Sung Park, Suwon-si (KR); Jong Ho Lee, Suwon-si (KR); Eun Ha Jang, Suwon-si (KR); Jong Hwan Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 919 days.

(21) Appl. No.: 17/827,677

(22) Filed: May 28, 2022

(65) Prior Publication Data

US 2023/0207201 A1      Jun. 29, 2023

(30) Foreign Application Priority Data

Dec. 27, 2021    (KR) ........................ 10-2021-0188595

(51) Int. Cl.
*H01G 4/12*          (2006.01)
*H01G 4/008*         (2006.01)
(Continued)

(52) U.S. Cl.
CPC ......... *H01G 4/1227* (2013.01); *H01G 4/0085* (2013.01); *H01G 4/012* (2013.01); *H01G 4/30* (2013.01)

(58) Field of Classification Search
CPC ..... H01G 4/10; H01G 4/12–1227; H01G 4/30
See application file for complete search history.

(56) References Cited

U.S. PATENT DOCUMENTS

| 2008/0030921 A1 | 2/2008 | Kaneda et al. |
| 2008/0112109 A1 | 5/2008 | Muto et al. |
| | (Continued) | |

FOREIGN PATENT DOCUMENTS

| JP | H05-270905 A | 10/1993 |
| JP | 2008-042150 A | 2/2008 |
| | (Continued) | |

OTHER PUBLICATIONS

Office Action issued in corresponding Korean Patent Application No. 10-2021-0188595 dated Aug. 6, 2025, with English translation.
(Continued)

*Primary Examiner* — Matthew E. Hoban
(74) *Attorney, Agent, or Firm* — MORGAN, LEWIS & BOCKIUS LLP

(57)          ABSTRACT

A dielectric composition and a multilayer capacitor including the same are disclosed. The dielectric composition including a $BaTiO_3$-based main ingredient, and an auxiliary ingredient including rare earth elements, wherein the rare earth elements include Dy and Eu, Dy and Eu molar contents based on 100 moles of the $BaTiO_3$-based main ingredient satisfy conditions of $0.10 < Eu/(Dy+Eu) \leq 0.50$ and $0.60 \leq Dy + Eu \leq 1.0$, and the rare earth elements do not include another element in a higher molar content than Dy and Eu.

16 Claims, 11 Drawing Sheets

(51) Int. Cl.
  *H01G 4/012*          (2006.01)
  *H01G 4/30*           (2006.01)

(56)                    References Cited

U.S. PATENT DOCUMENTS

2009/0086407  A1*    4/2009  Takahashi ............. C04B 35/638
                                                    361/321.5
2013/0222968  A1     8/2013  Koga et al.
2014/0009864  A1     1/2014  Takashima et al.
2017/0178812  A1*    6/2017  Shimada ................ H01G 4/248
2020/0395172  A1    12/2020  Choi et al.

FOREIGN PATENT DOCUMENTS

JP          2013-229551  A     11/2013
KR     10-2019-0116109  A     10/2019
WO          2006/132086  A1    12/2006
WO          2011/125543  A1    10/2011
WO          2012/120712  A1     9/2012

OTHER PUBLICATIONS

Da-Yong Lu, et al., "Dielectric properties and defect chemistry of
barium titanate ceramics co-doped R and Dy ions (R=Eu, Gd, Tb)",
Ceramics International vol. 42, Issue 13, pp. 14364-14373, May 30,
2016.
Office Action issued corresponding Japanese Patent Application No.
2022-085357 dated Mar. 31, 2026, with English translation.

* cited by examiner

FIRST
DIRECTION

THIRD
DIRECTION

II - II'

[105°C 15.00V 100.0hr]

DIELECTRIC COMPOSITION AND MULTILAYER CAPACITOR

CROSS-REFERENCE TO RELATED APPLICATION(S)

This application claims benefit of priority to Korean Patent Application No. 10-2021-0188595 filed on Dec. 27, 2021 in the Korean Intellectual Property Office, the disclosure of which is incorporated herein by reference in its entirety.

TECHNICAL FIELD

The present disclosure relates to a dielectric composition and a multilayer capacitor.

BACKGROUND

Capacitors are elements capable of storing electricity therein. When a voltage is applied to a capacitor in which two electrodes are basically disposed to face each other, the electricity is accumulated in each of the electrodes. In a case in which the voltage applied to the capacitor is a direct current (DC) voltage, a current flows in the capacitor while the electricity is accumulated, but the current does not flow in the capacitor once the accumulation of the electricity is completed. On the other hand, in a case in which the voltage applied to the capacitor is an alternating current (AC) voltage, an AC current flows in the capacitor while polarities of the electrodes alternate with each other.

Based on the type of insulator provided between electrodes, the capacitors may be classified as one of various types: an aluminum electrolytic capacitor including electrodes formed of aluminum and a thin oxide film between the aluminum electrodes; a tantalum capacitor using tantalum as an electrode material; a ceramic capacitor using a dielectric having high permittivity, such as titanium barium, between electrodes; a multilayer ceramic capacitor (MLCC) using high-permittivity ceramic in a multilayer structure as a dielectric provided between electrodes; a film capacitor using a polystyrene film as a dielectric between electrodes; and the like.

Thereamong, the multilayer ceramic capacitor has recently been used in devices within various fields such as high-frequency circuits because it has excellent temperature and frequency characteristics and it can be implemented to have a small size. Recently, it has been continuously attempted to further decrease a size of the multilayer ceramic capacitor. To this end, dielectric layers and internal electrodes have been formed to have small thicknesses.

In order to achieve a decrease in size and an increase in capacitance of the multilayer ceramic capacitor, it is necessary to increase the number of dielectric layers and internal electrodes stacked by decreasing the thicknesses of the dielectric layers and the internal electrodes.

Currently, the thickness of the dielectric layer has decreased to about 0.6 μm, and research on the decrease in thickness of the dielectric layer is being continuously conducted. However, the decrease in thickness of the dielectric layer may cause deteriorations in DC-bias characteristics as well as reliability and high-temperature withstand voltage characteristics. The DC-bias characteristics refer to a phenomenon in which capacitance or permittivity decreases as a size of a DC-bias field applied to an MLCC increases. In various cases in which MLCCs are applied, for example, application of MLCCs to power management integrated circuits, it is often that the MLCCs are used in a state where a DC-bias is applied thereto. Accordingly, there has been an increasing demand for an MLCC capable of realizing high effective permittivity or capacitance under a condition in which a high field DC-bias is applied thereto and a dielectric composition for manufacturing the same.

SUMMARY

An aspect of the present disclosure may provide a dielectric composition having high reliability and a multilayer capacitor using the same.

According to an aspect of the present disclosure, a dielectric composition includes a $BaTiO_3$-based main ingredient, and an auxiliary ingredient including rare earth elements, wherein the rare earth elements include Dy and Eu, Dy and Eu molar contents based on 100 moles of the $BaTiO_3$-based main ingredient satisfy conditions of $0.10<Eu/(Dy+Eu) \leq 0.50$ and $0.60 \leq Dy+Eu \leq 1.0$, and the rare earth elements do not include another element in a higher molar content than Dy and Eu.

A Dy molar content based on 100 moles of the $BaTiO_3$-based main ingredient may satisfy a condition of $0.30 \leq Dy \leq 0.70$.

A Eu molar content based on 100 moles of the $BaTiO_3$-based main ingredient may satisfy a condition of $0.10 \leq Eu \leq 0.50$.

The rare earth elements may include only Dy and Eu.

According to another aspect of the present disclosure, a multilayer capacitor may include: a body including a dielectric layer and a plurality of internal electrodes stacked with the dielectric layer interposed therebetween; and external electrodes disposed on the body and connected to the plurality of internal electrodes, wherein the dielectric layer includes a dielectric grain, the dielectric grain includes a $BaTiO_3$-based main ingredient and an auxiliary ingredient including rare earth elements, the rare earth elements include Dy and Eu, Dy and Eu molar contents based on 100 moles of the $BaTiO_3$-based main ingredient satisfy conditions of $0.10<Eu/(Dy+Eu) \leq 0.50$ and $0.60 \leq Dy+Eu \leq 1.0$, and the rare earth elements do not include another element in a higher molar content than Dy and Eu.

The dielectric grain may have a core-shell structure including a core portion and a shell portion having a different composition from the core portion.

The rare earth elements may be included in the shell portion.

A Dy molar content based on 100 moles of the $BaTiO_3$-based main ingredient may satisfy a condition of $0.30 \leq Dy \leq 0.70$.

A Eu molar content based on 100 moles of the $BaTiO_3$-based main ingredient may satisfy a condition of $0.10 \leq Eu \leq 0.50$.

The rare earth elements may include only Dy and Eu.

According to another aspect of the present disclosure, a multilayer capacitor may include: a body including a dielectric layer and a plurality of internal electrodes stacked with the dielectric layer interposed therebetween, wherein the dielectric layer includes a dielectric grain including a $BaTiO3$-based main ingredient and an auxiliary ingredient including rare earth elements, the rare earth elements include Dy and Eu, Dy and Eu molar contents based on 100 moles of the $BaTiO_3$-based main ingredient satisfy conditions of $0.10<Eu/(Dy+Eu) \leq 0.50$; and external electrodes disposed on the body and connected to the plurality of internal electrodes.

The Dy and Eu molar contents may satisfy $0.17<Eu/(Dy+Eu)\leq0.50$.

The Dy and Eu molar contents may satisfy $0.60\leq Dy+Eu\leq1.0$.

The rare earth elements may not include another element in a higher molar content than Dy and Eu.

The Dy molar content may satisfy $0.30\leq Dy\leq0.70$.

The Dy molar content may satisfy $0.30\leq Dy\leq0.50$.

The Eu molar content may satisfy $0.10\leq Eu\leq0.50$.

The Eu molar content may satisfy $0.20\leq Eu\leq0.30$.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
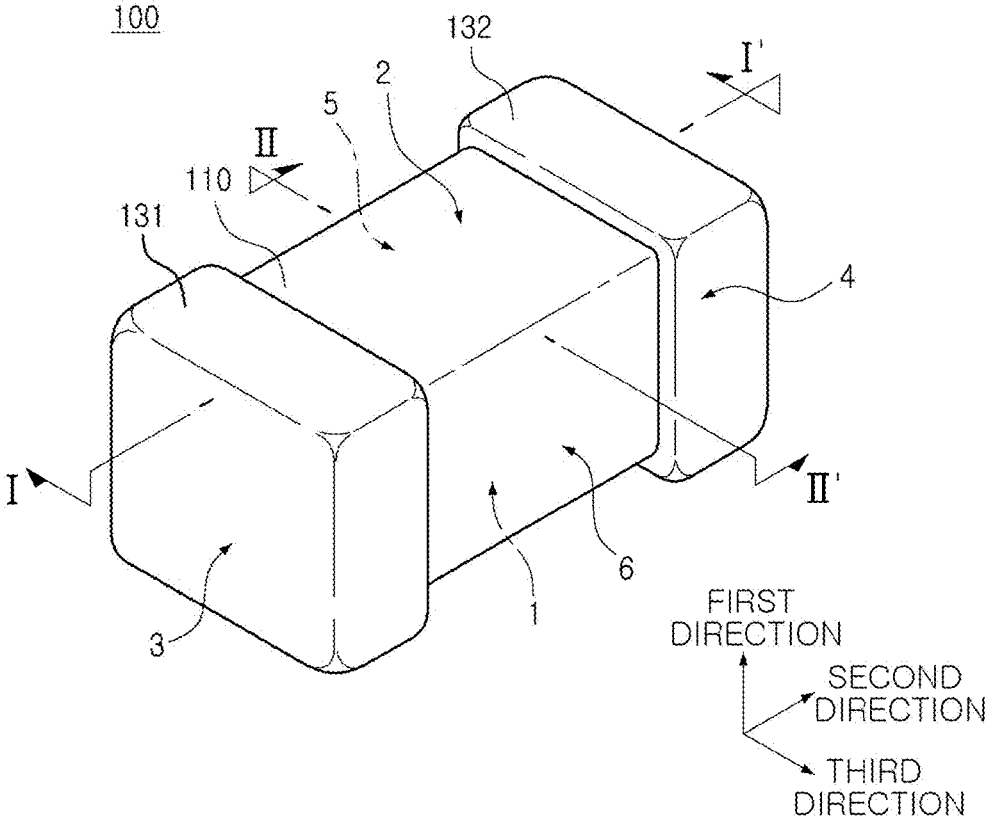
FIG. 1 is a schematic perspective view illustrating a multilayer capacitor according to an exemplary embodiment in the present disclosure.

Hereinafter, exemplary embodiments of the present disclosure will now be described in detail with reference to the accompanying drawings.

A dielectric composition according to an exemplary embodiment in the present disclosure may include a BaTiO₃-based main ingredient and an auxiliary ingredient including rare earth elements. Here, the rare earth elements may include Dy and Eu. In addition, Dy and Eu molar contents based on 100 moles of the BaTiO₃-based main ingredient may satisfy conditions of $0.10<Eu/(Dy+Eu)\leq0.50$ and $0.60\leq Dy+Eu\leq1.0$, and the rare earth elements may not include another element in a higher molar content than Dy and Eu. That is, in the dielectric composition, Dy and Eu are main additive elements among the rare earth elements, and the inventors of the present disclosure have found that a dielectric has electrical characteristics and reliability that vary depending on amounts of Dy and Eu added, and tried to optimize conditions for Dy and Eu contents. A dielectric composition satisfying the optimized composition conditions may exhibit high insulation resistance and temperature coefficient of capacitance (TCC) characteristics when used in a dielectric for a multilayer ceramic capacitor (MLCC). Here, the BaTiO₃-based main ingredient may be a composition in which Ca, Zr, Sn, or the like is solid-dissolved in BaTiO₃, e.g. $(Ba_{1-x}Ca_x)$ $(Ti_{1-y}Ca_y)O_3$ or $(Ba_{1-x}Ca_x)$ $(Ti_{1-y}Zr_y)O_3$. For example, as a main ingredient, the amount of BaTiO₃ may be at least 50% by weight of a total weight of BaTiO₃ and auxiliary ingredient in the dielectric composition.

The composition conditions of the auxiliary ingredients in the dielectric composition are set based on the functions of the main ingredients and experimental examples, which will be described below. The dielectric composition is sintered, mainly through great densification and grain growth, by virtue of the movement of material between ions. Here, the densification occurs through surface diffusion of ions, and the grain growth occurs through interfacial movement for reducing an overall surface area. In this case, as the number of grain boundaries, which is a high resistance factor, in the dielectric, increases, a charge movement rate may decrease. Therefore, the permittivity of the dielectric may be improved by refining dielectric grains to increase a grain boundary fraction. However, in a thin layer environment (for example, when a thickness of a dielectric layer is 0.5 μm or less) in which an electric field strength increases, a Schottky barrier may be lowered even at the grain boundary, resulting in an increase in electrical conductivity. An element having a higher work function than the BaTiO₃-based material may be added as an auxiliary ingredient to form a high potential barrier not only at the grain boundary but also at an interface between a core portion and a shell portion of the dielectric grain, and a method of making surfaces of particles of the BaTiO₃-based main ingredient into ionized coating surfaces may be used to increase reactivity between the base material and the additive.

In addition to the consideration of the grain boundary and the interface in the core-shell structure, it is advantageous that an electric charge has a low concentration in order for the dielectric to have a small thickness and a high level of insulation resistance in a high electric field environment. Specifically, by minimizing oxygen vacancy defects, which act as a major factor of a deterioration in insulation resistance of the MLCC, it is possible to prevent formation of p-n junctions in grains, which causes the deterioration in insulation resistance. In the present exemplary embodiment, in order to suppress a conduction phenomenon in the grains, rare earth elements may be used as elements having a strong n-type tendency. Specifically, different rare earth elements may be added as the auxiliary ingredient to the BaTiO₃-based main ingredient, and the rare earth elements may include Dy and Eu. Conventionally, Dy alone has generally been used as a rare earth element, but there has been a limit in an amount of $Dy^{3+}$ ions solid-dissolved at a Ba-site of the BaTiO₃-based main ingredient, and thus, there has been a limitation in implementing the characteristics of the dielectric. In the present exemplary embodiment, in order to maximize the effect in solid-dissolving the rare earth elements, Eu may be used together with Dy, Eu having a higher atomic value and a larger ion size than Dy while Eu ions have a similar size to $Ba^{2+}$ ions, so that $Ba^{2+}$ ions are substituted in a more effective way. Therefore, the BaTiO₃-based main ingredient may be doped with Eu in a larger amount more uniformly than Dy, and the use of Eu together with Dy makes it possible to implement uniformity between microstructures of dielectric grains and high-temperature reliability as compared with the use of Dy alone. However, if the Dy and Eu contents excessively increase, reliability characteristics such as insulation resistance may deteriorate. This is because the addition of Dy or Eu in the excessive amount rapidly decreases the insulation resistance due to excessive semiconductorization resulting from an increase in electron concentration.

Based on the aforementioned considerations and experimental results, the inventors of the present disclosure attempted to optimize the content conditions of the rare earth auxiliary ingredients. As a result, above all, the conditions for the Dy and Eu molar contents based on 100 moles of the BaTiO₃-based main ingredient have been derived as $0.10<Eu/(Dy+Eu)\leq0.50$ and $0.60\leq Dy+Eu\leq1.0$. In some embodiments, the Dy and Eu molar contents may satisfy $0.17<Eu/(Dy+Eu)\leq0.50$. As more preferable conditions, the Dy molar content based on 100 moles of the $BaTiO_3$-based main ingredient may satisfy a condition of $0.30\leq Dy\leq0.70$ or $0.30\leq Dy<0.50$, and the Eu molar content based on 100 moles of the $BaTiO_3$-based main ingredient may satisfy a condition of $0.10\leq Eu\leq0.50$ or $0.20\leq Eu\leq0.30$. In addition, the rare earth elements may include only Dy and Eu.

As described above, in the dielectric composition according to the present exemplary embodiment, the combination of the rare earth elements added as the auxiliary ingredient is optimized, and improvements of the dielectric not only in uniformity between microstructures and density but also in high-temperature reliability and withstand voltage may be expected therefrom. In addition, a content ratio between rare earth elements may vary depending on what rare earth elements are to be combined together. This may be because of deficient chemical reaction according to differences in ionic radius and valence between Dy and Eu. That is, the contents of the rare earth elements need to vary depending on what rare earth elements are to be added, because even if the rare earth elements are contained in the same content, a rare earth element having a more similar ionic radius to Ba may have donor-richer deficient chemical reaction, generating electrons and thereby causing n-type conduction. However, when Eu, which has a strong donor-type tendency, is used alone or added in an excessively high content as compared with Dy, electron emission may be excessive, resulting in a reduction in insulation resistance of the dielectric. Therefore, it is preferable to satisfy the content conditions proposed above.

Hereinafter, an example of a multilayer capacitor obtainable by using the above-described dielectric composition will be described. However, the dielectric composition of the present disclosure may be applied to various electronic products, e.g., an inductor, a piezoelectric element, a varistor, or a thermistor, as well as the multilayer capacitor.

Figure 2:
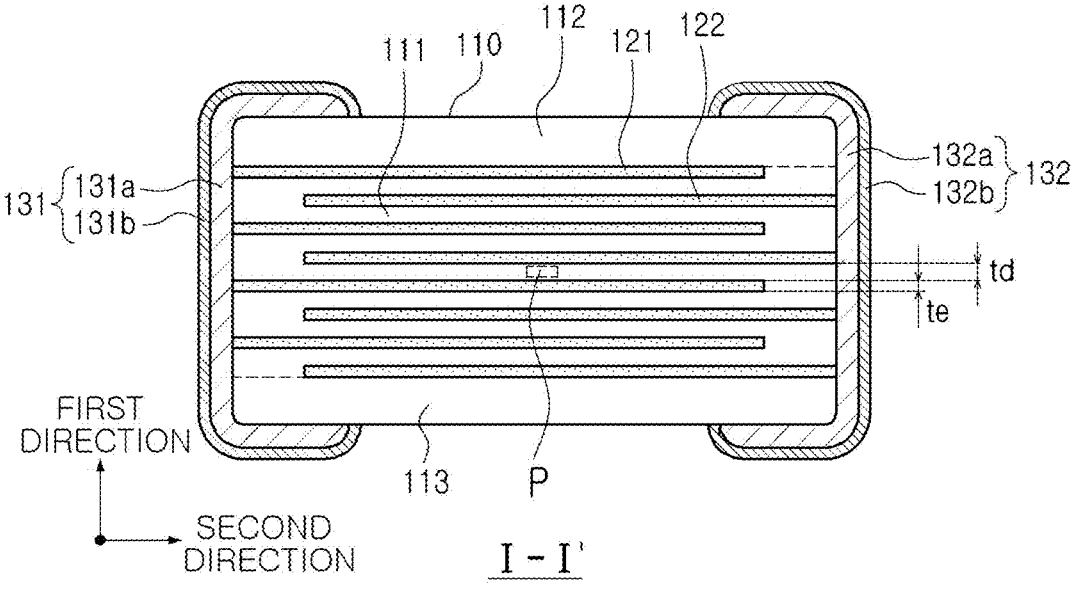
FIG. 2 is a schematic cross-sectional view taken along line I-I' of FIG. 1.
Figure 3:
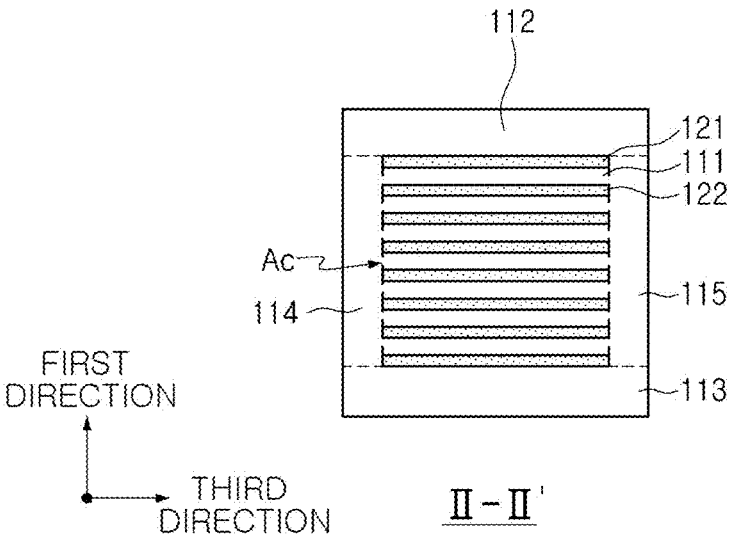
FIG. 3 is a schematic cross-sectional view taken along line II-II' of FIG. 1.
Figure 4:
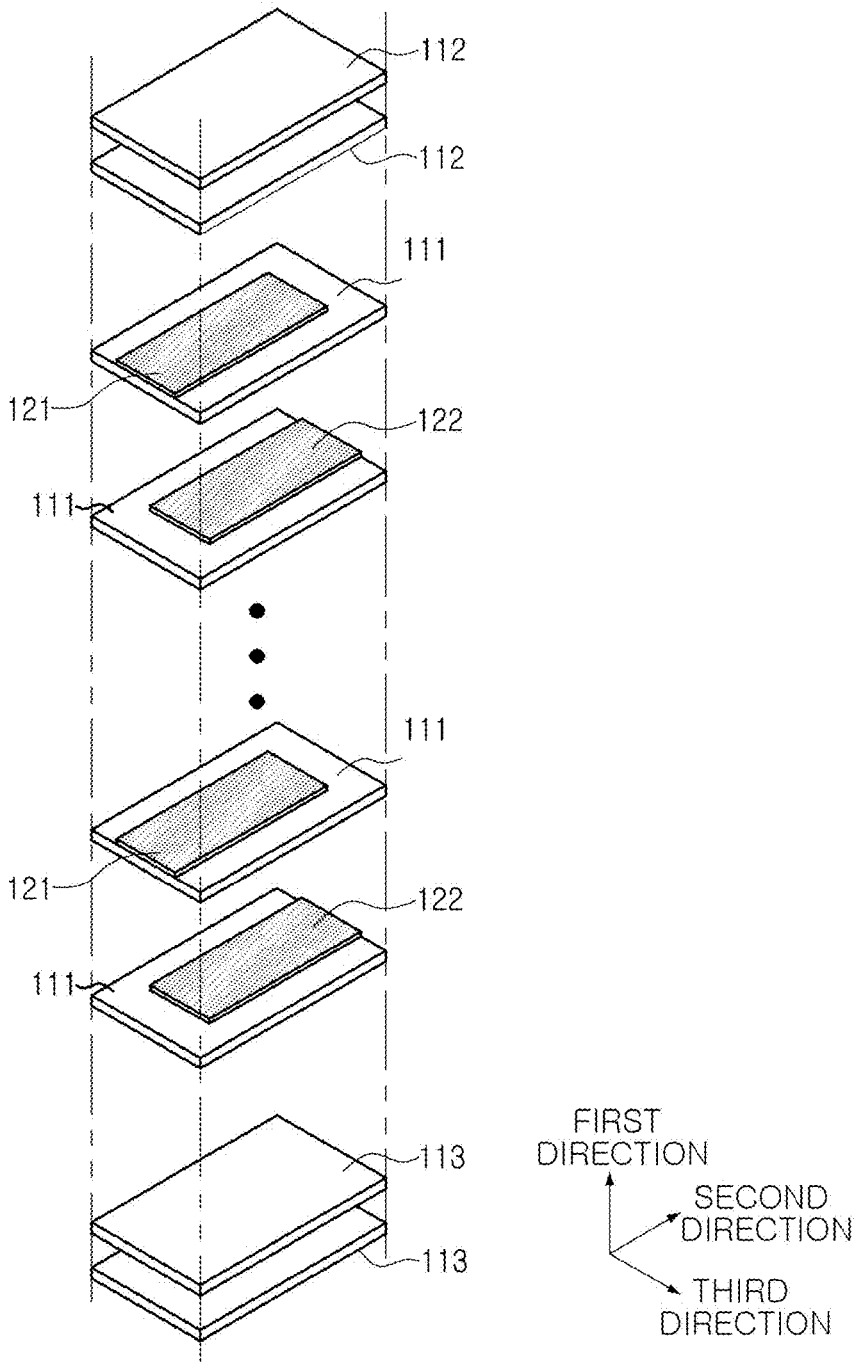
FIG. 4 is a schematic exploded perspective view illustrating a body of the multilayer capacitor according to an exemplary embodiment in the present disclosure.
Figure 5:
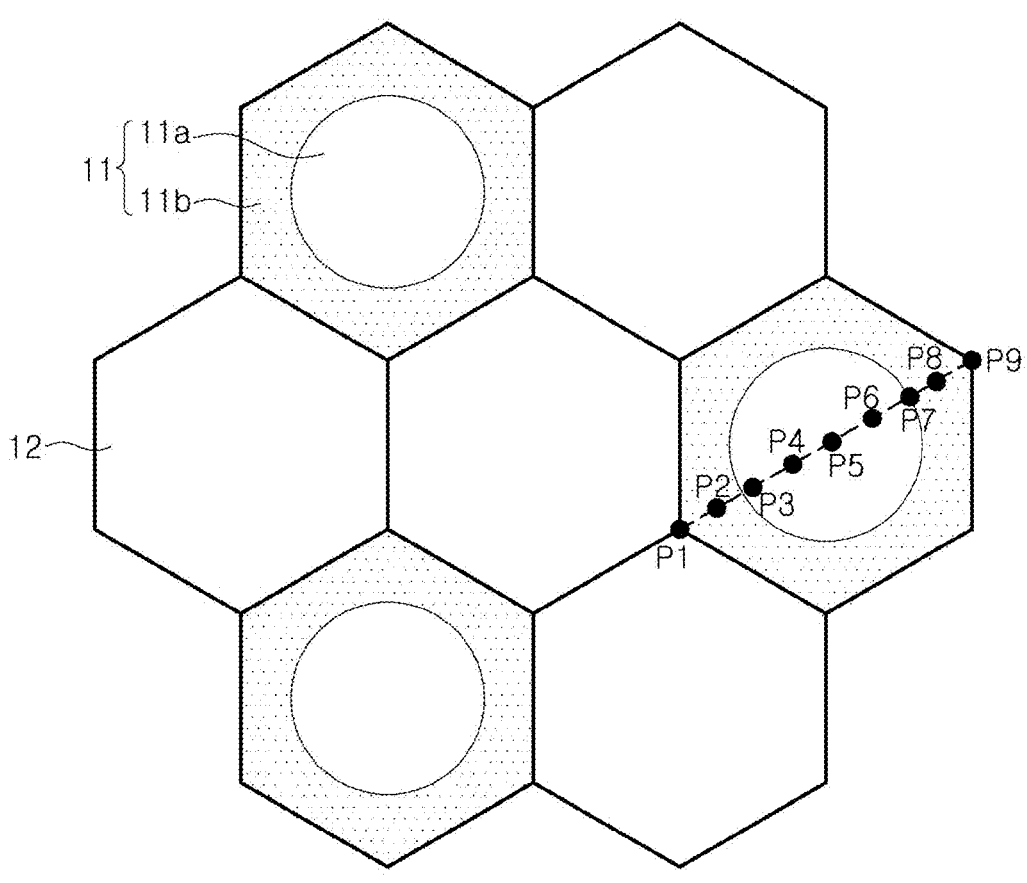
FIG. 5 is a schematic view for explaining microstructures in a dielectric layer of the present disclosure.

FIG. 1 is a schematic perspective view illustrating a multilayer capacitor according to an exemplary embodiment in the present disclosure. FIG. 2 is a schematic cross-sectional view taken along line I-I' of FIG. 1. FIG. 3 is a schematic cross-sectional view taken along line II-II' of FIG. 1. FIG. 4 is a schematic exploded perspective view illustrating a body of the multilayer capacitor according to an exemplary embodiment in the present disclosure. FIG. 5 is a schematic view for explaining microstructures in a dielectric layer of the present disclosure.

Referring to FIGS. 1 through 5, a multilayer capacitor 100 according to an exemplary embodiment in the present disclosure may include a body 110 and external electrodes 131 and 132. Here, the body 110 may include a plurality of dielectric layers 111 and a plurality of internal electrodes 121 and 122 stacked with each of the dielectric layers 111 interposed therebetween.

In the body 110, the dielectric layers 111 and the internal electrodes 121 and 122 may be alternately stacked. A specific shape of the body 110 is not particularly limited, and the body 110 may have a hexahedral shape or the like as illustrated. Although the body 110 does not have a hexahedral shape having perfectly straight lines because ceramic powder included in the body 110 shrinks in a sintering process, the body 110 may have a substantially hexahedral shape. The body 110 may have first and second surfaces 1 and 2 facing each other in a first direction, third and fourth surfaces 3 and 4 connected to the first and second surfaces 1 and 2 and facing each other in a second direction, and fifth and sixth surfaces 5 and 6 connected to the first and second surfaces 1 and 2, connected to the third and fourth surfaces 3 and 4, and facing each other in a third direction. The plurality of dielectric layers 111 forming the body 110 may be integrated to such an extent as to be difficult to see a boundary between adjacent dielectric layers 111 in a sintered state without using a scanning electron microscope (SEM).

The body 110 may include a capacitance forming portion Ac disposed in the body 110 and forming capacitance by including first internal electrodes 121 and second internal electrodes 122 disposed to face each other with each of the dielectric layers 111 interposed therebetween, and cover portions 112 and 113 formed on upper and lower surfaces of the capacitance forming portion Ac in the first direction, respectively. In addition, the capacitance forming portion Ac, which contributes to forming the capacitance of the capacitor, may be formed by repeatedly stacking the plurality of first and second internal electrodes 121 and 122 with each of the dielectric layers 111 interposed therebetween.

Referring to FIG. 5, the dielectric layers 111 may include dielectric grains 11 each having a core-shell structure including a core portion 11a and a shell portion 11b having a different composition from the core portion 11a, and may also include dielectric grains 12 each having a non-core-shell structure. When the dielectric layers 111 of the multi-layer capacitor 100 are formed using the above-described dielectric composition, the dielectric grains 11 and 12 of the dielectric layers 111 may include a $BaTiO_3$-based main ingredient and an auxiliary ingredient including rare earth elements, wherein the rare earth elements may include Dy and Eu, Dy and Eu molar contents based on 100 moles of the $BaTiO_3$-based main ingredient satisfy conditions of $0.10<Eu/(Dy+Eu)\leq0.50$ and $0.60\leq Dy+Eu\leq1.0$, and the rare earth elements do not include another element in a higher molar content than Dy and Eu. As a more specific example, the above-described rare earth auxiliary ingredient may be solid-dissolved in the $BaTiO_3$-based main ingredient to form a shell portion 11b. Therefore, the shell portion 11b may include a $BaTiO_3$-based main ingredient and an auxiliary ingredient including rare earth elements, wherein the rare earth elements include Dy and Eu, and Dy and Eu molar contents based on 100 moles of the $BaTiO_3$-based main ingredient satisfy conditions of $0.10<Eu/(Dy+Eu)\leq0.50$ and $0.60\leq Dy+Eu\leq1.0$. In the following example, it will be described that the rare earth auxiliary ingredient is present in the shell portion 11b, but some of the rare earth auxiliary ingredient may also be present in the core portion 11a.

When a diameter of the core portion 11a in the dielectric grain 11 having the core-shell structure is defined as D1, D1 may satisfy a condition of $5\ nm\leq D1\leq100$ nm. In addition, when a diameter of the dielectric grain 11 is defined as D2, D2 may satisfy a condition of $50\ nm\leq D2\leq600$ nm. In this case, the diameter of the dielectric grain 11 may be a value obtained by measuring an area of each of the dielectric grains 11, converting the dielectric grain 11 into a circle having the measured area, and calculating a diameter of the circle equivalent to the dielectric grain 11. Concerning the contents of the rare earth elements, i.e., Dy and Eu, in the dielectric grain 11 having the core-shell structure, a line segment may be drawn from one end to the opposite end of one grain 11 with nine points P1 to P9 put at equal intervals as shown in FIG. 5, and contents of at least one of Dy and Eu at P1 to P9 may be analyzed using STEM/EDS. More specifically, after region P of FIG. 2 is scanned by a STEM to obtain an image thereof, contents of an element to be detected at the positions P1 to P9 may be analyzed through STEM/EDS analysis. Through this analysis, a boundary between the core portion 11a and the shell portion 11b may be determined. For example, a region in which the rare earth element is not substantially detected inwardly from a surface of the dielectric grain 11 may be determined as a boundary.

Meanwhile, the auxiliary ingredient included in the above-described dielectric composition may be added in the form of an oxide or a carbonate, but may be present in a solid-dissolved form in the $BaTiO_3$-based main ingredient, rather than in the form of the oxide or the carbonate, after being sintered. However, a content ratio between main elements of the auxiliary ingredient may be kept almost constant, and respective contents of elements of the dielectric layer after being sintered may be calculated based on the contents of the main ingredient and auxiliary ingredient included in the dielectric composition before the dielectric layer is sintered. In addition, the respective contents of the elements included in the dielectric layer 111 may be measured using a non-destructive method, a destructive method, or the like. For example, in the non-destructive method, ingredients inside a dielectric grain in a central portion of a chip may be analyzed using TEM-EDS. Specifically, an analysis sample slice may be prepared using focused ion beam (FIB) equipment from a region including a dielectric layer in a cross-section of a body having been sintered. Then, a damaged layer may be removed from a surface of the sample slice using Ar ion milling, and thereafter, mapping and quantitative analysis may be performed for each ingredient from an obtained image using STEM-EDS. In this case, a quantitative analysis graph for each ingredient may be obtained based on a mass fraction of each element, which may be converted into and expressed as a mole fraction or an atomic fraction. On the other hand, in the destructive method, a dielectric may be separated after a multilayer capacitor is crushed and internal electrodes are removed, and ingredients of the dielectric separated as described above may be analyzed using a device such as an inductively coupled plasma-optical emission spectroscopy (ICP-OES) or an inductively coupled plasma-mass spectroscopy (ICP-MS).

Hereinafter, other components of the body 110 will be described, and the above-described dielectric compositions may be used when forming cover portions 112 and 113 and margin portions 114 and 115 as well as the dielectric layers 111.

The cover portions 112 and 113 may include an upper cover portion 112 disposed on the upper surface of the capacitance forming portion Ac in the first direction and a lower cover portion 113 disposed on the lower surface of the capacitance forming portion Ac in the first direction. The upper cover portion 112 and the lower cover portion 113 may be formed by stacking a single dielectric layer or two or more dielectric layers on each of the upper and lower surfaces of the capacitance forming portion Ac in a thickness direction, and may basically serve to prevent the internal electrodes from being damaged due to physical or chemical stress. The upper cover portion 112 and the lower cover portion 113 may include the same material as the dielectric layers 111, while including no internal electrodes. That is, the upper cover portion 112 and the lower cover portion 113 may include a ceramic material, e.g., a barium titanate ($BaTiO_3$)-based ceramic material. Meanwhile, it is not necessary to particularly limit a thickness of each of the cover portions 112 and 113. However, in order to more easily achieve a decrease in size of the multilayer capacitor and an increase in capacitance of the multilayer capacitor, the thickness of each of the cover portions 112 and 113 may be 20 μm or less.

The margin portions 114 and 115 may be disposed on side surfaces of the capacity forming portion Ac. The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on opposite side surfaces of the ceramic body 110 in a width direction. As illustrated in FIG. 3, the margin portions 114 and 115 may refer to regions between both ends of the first and second internal electrodes 121 and 122 and boundary surfaces of the body 110 in a cross-section of the body 110 cut in the width and thickness (W-T) directions. The margin portions 114 and 115 may basically serve to prevent the internal electrodes from being damaged due to physical or chemical stress. The margin portions 114 and 115 may be formed by applying a conductive paste for forming internal electrodes onto ceramic green sheets except places where the margin portions are to be formed. Alternatively, in order to suppress unevenness in thickness of the capacitance forming portion Ac due to the internal electrodes 121 and 122, the margin portions 114 and 115 may be formed by cutting a laminate formed by stacking the ceramic green sheets with the conductive paste for forming internal electrodes applied thereonto so that the internal electrodes are exposed to the fifth and sixth surfaces 5 and 6 of the body, and then stacking a single dielectric layer or two or more dielectric layers on each of opposite side surfaces of the capacitance forming portion Ac in the width direction (third direction).

Meanwhile, it is not necessary to particularly limit a thickness td of each of the dielectric layers 111. However, in general, when the dielectric layers are formed to have a small thickness of less than 0.6 μm, in particular 0.5 μm or less, there is concern that reliability may decrease. As described above, according to an exemplary embodiment in the present disclosure, it is possible to secure high permittivity at room temperature, excellent DC-bias characteristics, and excellent high-temperature withstand voltage characteristics, and thus, excellent reliability can be secured even when the thickness of each of the dielectric layers 111 is 0.5 μm or less. Therefore, when the thickness of each of the dielectric layers 111 is 0.5 μm or less, the reliability improving effect according to the present disclosure can be more remarkable. The thickness td of each of the dielectric layers 111 may refer to an average thickness of each of the dielectric layers 111 disposed between the first and second internal electrodes 121 and 122. The average thickness of each of the dielectric layers 111 may be measured from an image obtained by scanning a cross-section of the body 110 in the length and thickness (L-T) directions using a scanning electron microscope (SEM). For example, with respect to any dielectric layer extracted from an image obtained by scanning a cross-section of the body 110 in the first and second directions (the length and thickness directions) cut at a central portion of the body 110 in the third direction (the width direction) using the scanning electron microscope (SEM), thicknesses of the dielectric layer at 30 points equally spaced in the length direction may be measured to obtain an average value. The thicknesses of the dielectric layer at the equally-spaced 30 points may be measured within the capacitance forming portion Ac, which refers to a region in which the first and second internal electrodes 121 and 122 overlap each other.

The internal electrodes 121 and 122 may be stacked alternately with the dielectric layers 111. The internal electrodes 121 and 122 may include first and second internal electrodes 121 and 122. The first and second internal electrodes 121 and 122 may be alternately disposed to face each other with each of the dielectric layers 111 constituting the body 110 interposed therebetween, and exposed to the third and fourth surfaces 3 and 4 of the body 110, respectively. Referring to FIG. 2, the first internal electrodes 121 may be spaced apart from the fourth surface 4 of the body 110 and exposed through the third surface 3 of the body 110, and the second internal electrodes 122 may be spaced apart from the third surface 3 of the body 110 and exposed through the fourth surface 4 of the body 110. In this case, the first and second internal electrodes 121 and 122 may be electrically disconnected from each other by each of the dielectric layers 111 disposed therebetween. Referring to FIG. 4, the body 110 may be formed by alternately stacking ceramic green sheets on which the first internal electrodes 121 are printed and ceramic green sheets on which the second internal electrode 122 are printed, followed by sintering. A material for forming the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and an alloy thereof. In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and an alloy thereof on ceramic green sheets. The conductive paste for internal electrodes may be printed using a screen printing method, a gravure printing method, or the like, but the method of printing the conductive paste is not limited thereto.

Meanwhile, it is not necessary to particularly limit a thickness te of each of the internal electrodes 121 and 122. However, in general, when the internal electrodes are formed to have a small thickness of less than 0.6 μm, in particular 0.5 μm or less, there is concern that reliability may decrease. As described above, according to an exemplary embodiment in the present disclosure, it is possible to secure high permittivity at room temperature, excellent DC-bias characteristics, and excellent high-temperature withstand voltage characteristics, and thus, excellent reliability can be secured even when the thickness of each of the internal electrodes 121 and 122 is 0.5 μm or less. Therefore, when the thickness of each of the internal electrodes 121 and 122 is 0.5 μm or less, the effect according to the present disclosure can be more remarkable, and the decrease in size and the increase in capacitance of the multilayer capacitor can be easily achieved. The thickness te of each of the internal electrodes 121 and 122 may refer to an average thickness of each of the first and second internal electrodes 121 and 122. The average thickness of each of the internal electrodes 121 and 122 may be measured from an image obtained by scanning a cross-section of the body 110 in the length and thickness (L-T) directions using a scanning electron microscope (SEM). For example, with respect to any one of first and second internal electrodes 121 and 122 extracted from an image obtained by scanning a cross-section of the body 110 in the first and second directions (the length and thickness directions) cut at a central portion of the body 110 in the third direction (the width direction) using the scanning electron microscope (SEM), thicknesses of the internal electrode at 30 points equally spaced in the length direction may be measured to obtain an average value. The thicknesses of the internal electrode at the equally-spaced 30 points may be measured within the capacitance forming portion Ac, which refers to a region in which the first and second internal electrodes 121 and 122 overlap each other.

The external electrodes 131 and 132 may be disposed on the third surface 3 and the fourth surface 4 of the body 110, respectively. The external electrodes 131 and 132 may include first and second external electrodes 131 and 132 disposed on the third and fourth surfaces 3 and 4 of the body 110, respectively, and connected to the first and second internal electrodes 121 and 122, respectively. Referring to FIG. 1, the external electrodes 131 and 132 may be disposed to cover opposite end surfaces of the side margin portions 114 and 115 in the second direction. Although it is described in the present exemplary embodiment that the multilayer capacitor 100 includes two external electrodes 131 and 132, the number, the shape, and the like of external electrodes 131 and 132 may be modified depending on shapes of the internal electrodes 121 and 122 or according to other purposes. Meanwhile, the external electrodes 131 and 132 may be formed using any type of material as long as it has electrical conductivity, such as a metal, and a specific material for forming the external electrodes 131 and 132 may be determined in consideration of electrical characteristics, structural stability, etc. Furthermore, the external electrodes 131 and 132 may have a multilayer structure. For example, the external electrodes 131 and 132 may include electrode layers 131a and 132a disposed on the body 110, and plating layers 131b and 132b formed on the electrode layers 131a and 132a, respectively. As a more specific example of the electrode layers 131a and 132a, each of the electrode layers 131a and 132a may be a fired electrode including a conductive metal and a glass or a resin-based electrode including a conductive metal or a resin.

Alternatively, each of the electrode layers 131a and 132a may be formed by sequentially stacking a fired electrode and a resin-based electrode on the body. In addition, each of the electrode layers 131a and 132a may be formed by transferring a sheet including a conductive metal onto the body or by transferring a sheet including a conductive metal onto a fired electrode. The conductive metal included in the electrode layers 131a and 132a may be a material having excellent electrical connectivity, but is not particularly limited thereto. For example, the conductive metal may be one or more of nickel (Ni), copper (Cu), and an alloy thereof. The plating layers 131b and 132b may serve to improve mounting characteristics of the multilayer capacitor. The type of material for forming the plating layers 131b and 132b is not particularly limited, and may include one or more of Ni, Sn, Pd, and an alloy thereof. Also, each of the plating layers 131b and 132b may be formed as a plurality of layers. As a more specific example of the plating layers 131b and 132b, the plating layers 131b and 132b may be Ni plating layers or Sn plating layers, or may be formed by sequentially stacking Ni plating layers and Sn plating layers on the electrode layers 131a and 132a, respectively, or by sequentially stacking Sn plating layers, Ni plating layers, and Sn plating layers on the electrode layers 131a and 132a, respectively. Alternatively, each of the plating layers 131b and 132b may include a plurality of Ni plating layers and/or a plurality of Sn plating layers.

It is not necessary to particularly limit a size of the multilayer capacitor 100. However, in order to achieve both the decrease in size and the increase in capacitance of the multilayer capacitor, it is required to increase the number of dielectric layers and internal electrodes stacked by decreasing the thicknesses of the dielectric layers and the internal electrodes. For example, when the multilayer capacitor 100 has a size of 0402 (length×width=0.4 mm×0.2 mm) or less, the effects according to the present disclosure can be more remarkable in improving DC-bias characteristics and high-temperature withstand voltage characteristics. Therefore, considering manufacturing errors, sizes of external electrodes, etc., when the multilayer capacitor 100 has a length of 0.44 mm or less and a width of 0.22 mm or less, the reliability improving effect according to the present disclosure can be more remarkable. Here, the length of the multilayer capacitor 100 may refer to a maximum size of the multilayer capacitor 100 in the second direction, and the width of the multilayer capacitor 100 may refer to a maximum size of the multilayer capacitor 100 in the third direction.

Hereinafter, the present disclosure will be described in more detail through experimental examples performed by the inventors of the present disclosure, but the experimental examples are presented to help specifically understand the disclosure, and the scope of the present disclosure is not limited only by the experimental examples.

As a base material main ingredient, BaTiO$_3$ powder having a grain size of 300 nm or more and 100 nm or less was used. In this case, a specific composition of the auxiliary ingredient was as shown in Table 1 below. A ceramic slurry was prepared by mixing/dispersing base material main ingredient powder and auxiliary ingredient powder using zirconia balls, mixing ethanol/toluene and a dispersant therewith, and then performing mechanical milling. In this case, a sintering aid ingredient including Si, Al, Na, Li, or the like was added together with the main ingredient and the rare earth auxiliary ingredient. In addition, a binder mixing process was added to increase a strength of a dielectric sheet. Ceramic green sheets for forming a laminate were formed using the slurry prepared, and an internal electrode paste was applied onto the ceramic green sheets. In addition, sheets were manufactured at a thickness of about 0.8 μm from the slurry prepared using an on-roll molding coater in a head-discharge type, and the molding sheets obtained as described above were attached onto sides of the laminate to which internal electrodes are exposed to form side margin portions. As a result, the laminate having a length of 0.6 mm, a width of 0.3 mm, and a height of 0.3 mm before being sintered was obtained.

Figure 6A:
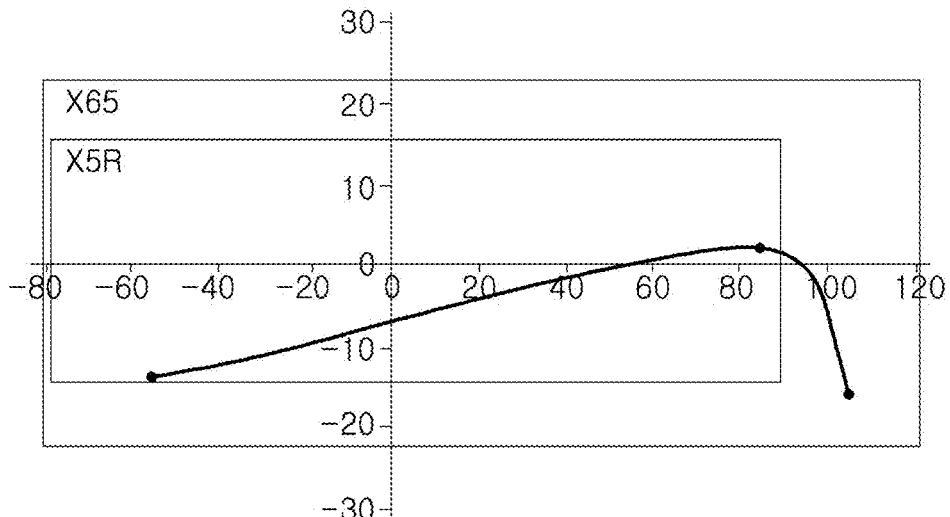
FIGS. 6A, 6B, 7A, 7B, 8A, and 8B show experimental results for temperature coefficient of capacitance (TCC) and mean time to failure (MTTF) indicating effects of Dy and Eu molar contents on the reliability of dielectrics.
Figure 6B:
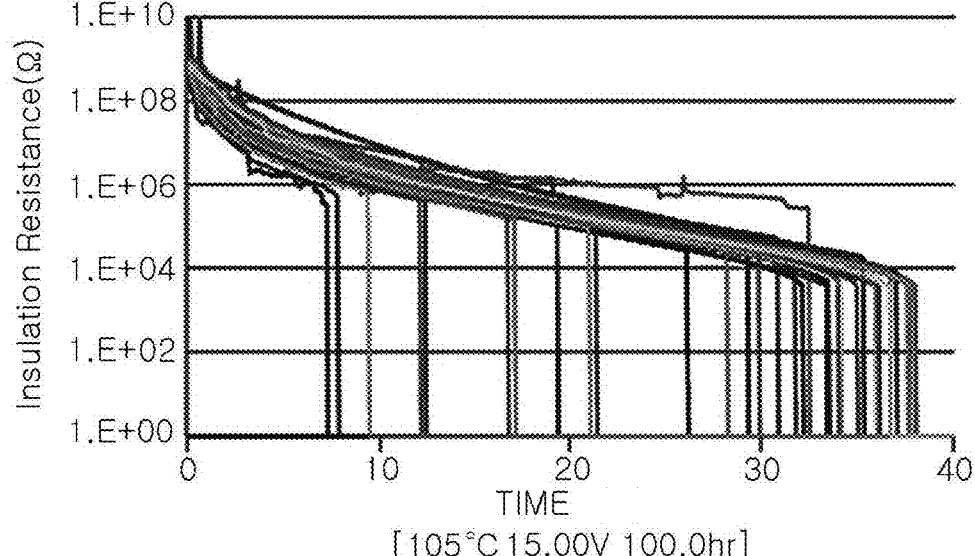
Figure 7A:
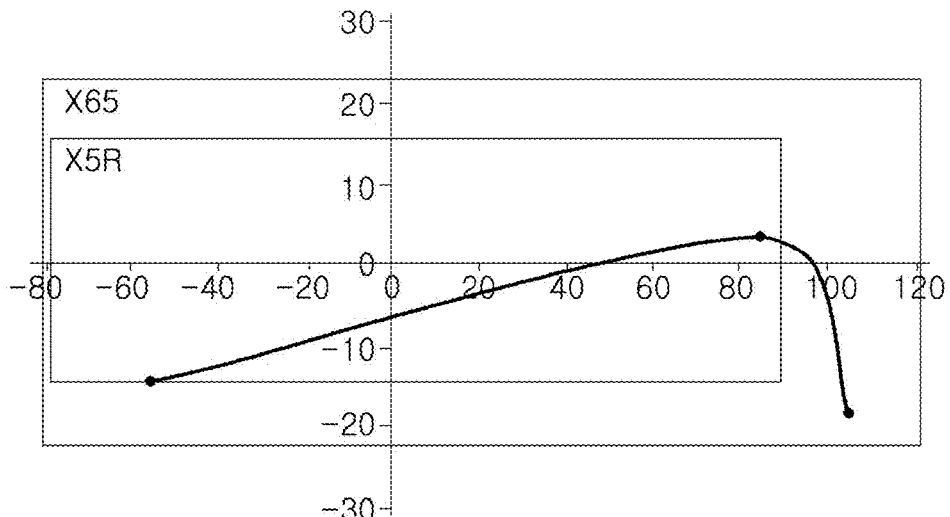
Figure 7B:
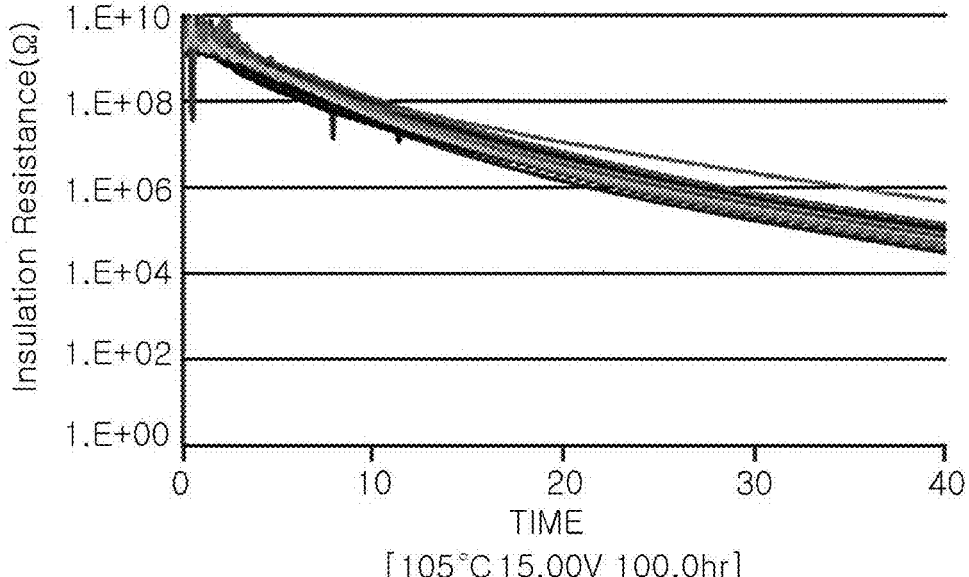
Figure 8A:
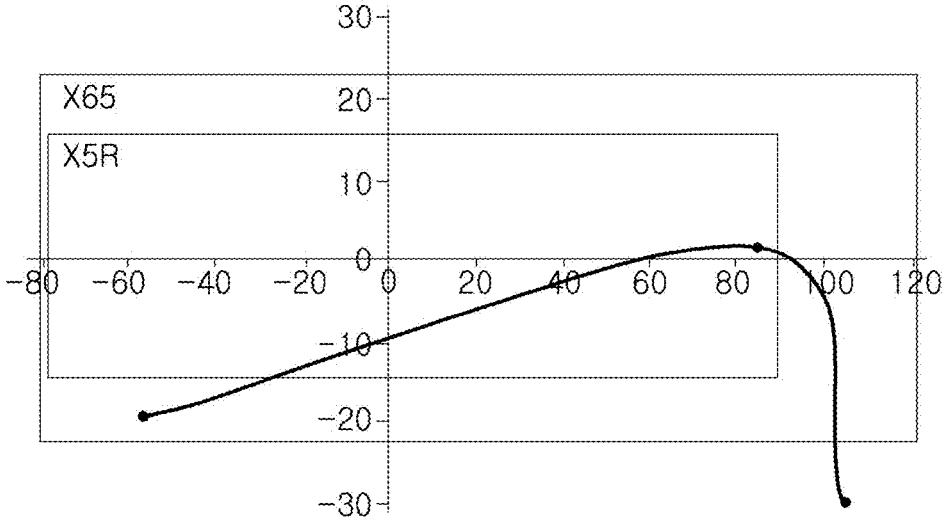
Figure 8B:
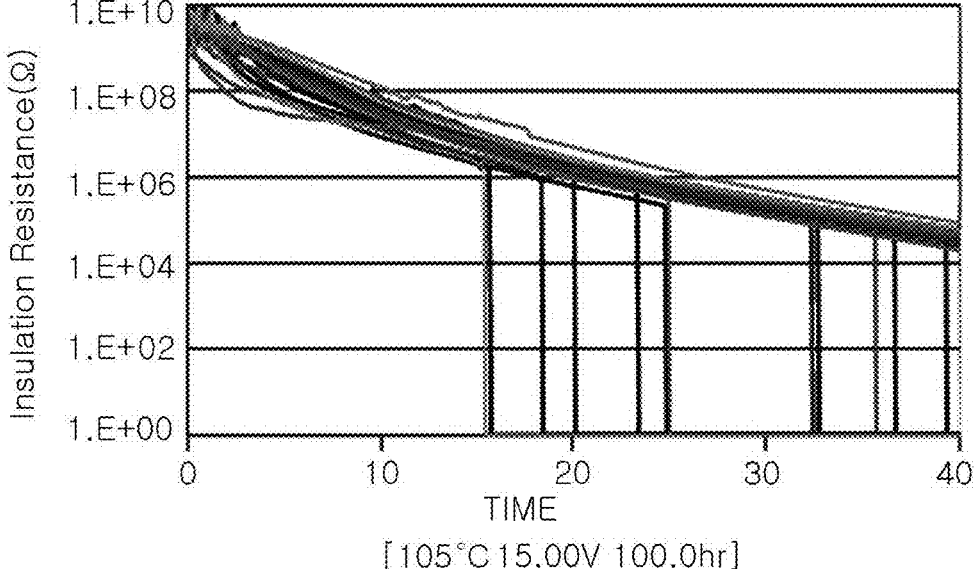

Table 1 shows experimental results of samples, in each of which a content of a rare earth auxiliary ingredient is a molar content of a rare earth auxiliary ingredient added based on 100 moles of the BaTiO$_3$-based main ingredient. The green chip-type laminate manufactured as described above was sintered at a sintering temperature of 1200° C. or less and at a hydrogen concentration of 1.0% (H$_2$) or less after a binder burn-out process at a temperature of 900° C. or less and under a nitrogen atmosphere. Thereafter, with respect to the samples obtained, structural characteristics, that is, sinterability (density and uniformity between microstructures), and electrical characteristics (permittivity, high temperature reliability, and temperature characteristics) were measured, and the following results were obtained. Specifically, each sample was tested by measuring a room-temperature capacitance and a dielectric loss at 1 kHz and at AC 0.5 V using an LCR meter, and measuring a breakdown voltage (BDV), at which dielectric breakdown occurred, for the withstand voltage characteristics. A mean time to failure (MTTF) was measured for the high-temperature reliability, and a capacitance change rate compared to a capacitance at room temperature of 25° C. was monitored for the TCC temperature characteristics by measuring a capacitance in each temperature section in the range of −55° C. to +105° C. while raising or lowering a temperature under the condition that the temperature is maintained for 5 minutes in each temperature section. For the structural characteristics, a density and a degree of uniformity in size between grains were measured with respect to a fractured surface and a polished surface of each of the samples. In addition, FIGS. 6A through 8B show experimental results for TCC (FIGS. 6A, 7A, and 8A) and MTTF (FIGS. 6B, 7B, and 8B) indicating effects of Dy and Eu molar contents on the reliability of dielectrics. Here, all of the samples used in the experiments of FIGS. 6A through 8B satisfy the condition of 0.10<Eu/(Dy+Eu)≤0.50, while being different in Dy+Eu content condition. Specifically, the samples of FIGS. 6A and 6B satisfy Dy+Eu<0.60, the samples of FIGS. 7A and 7B satisfy 0.60≤Dy+Eu≤1.0, and the samples of FIGS. 8A and 8B satisfy 1.0<Dy+Eu. FIG. 7 corresponds to an exemplary embodiment in the present disclosure. In the graphs of FIGS. 6A, 7A, and 8A for TCC, a horizontal axis indicates a temperature and a vertical axis indicates a relative capacitance (%). Meanwhile, symbols used in Table 1 below indicate ⊚: excellent, ○: good, Δ: normal, and X: Poor.

TABLE 1

| | Dy | Eu | Eu/(Dy + Eu) | Permittivity | High-Temperature Reliability | Temperature Characteristics | Sinterability |
|---|---|---|---|---|---|---|---|
| 1 | 1.3 | 0.1 | 0.07 | ○ | Δ | X | X |
| 2 | 1.0 | 0.4 | 0.29 | ○ | ○ | X | X |
| 3 | 0.7 | 0.7 | 0.50 | Δ | ○ | X | X |
| 4 | 0.4 | 1.0 | 0.71 | Δ | Δ | X | X |
| 5 | 0.1 | 1.3 | 0.93 | X | X | X | X |
| 6 | 0.9 | 0.1 | 0.10 | ○ | X | ○ | ○ |
| 7* | 0.7 | 0.3 | 0.30 | ⊚ | ⊚ | ⊚ | ○ |
| 8* | 0.5 | 0.5 | 0.50 | ⊚ | ⊚ | ⊚ | ○ |
| 9 | 0.3 | 0.7 | 0.70 | ○ | Δ | ○ | ○ |
| 10 | 0.1 | 0.9 | 0.90 | Δ | X | ○ | ○ |
| 11 | 0.6 | 0 | 0.00 | Δ | X | ○ | ○ |
| 12* | 0.5 | 0.1 | 0.17 | ○ | ○ | ○ | ⊚ |
| 13* | 0.4 | 0.2 | 0.33 | ⊚ | ⊚ | ⊚ | ⊚ |
| 14* | 0.3 | 0.3 | 0.50 | ⊚ | ⊚ | ⊚ | ⊚ |
| 15 | 0.2 | 0.4 | 0.67 | ○ | Δ | ⊚ | ⊚ |
| 16 | 0.1 | 0.5 | 0.83 | Δ | Δ | ⊚ | ⊚ |
| 17 | 0 | 0.6 | 1.00 | Δ | Δ | ⊚ | ⊚ |

TABLE 1-continued

| | Dy | Eu | Eu/(Dy + Eu) | Permittivity | High-Temperature Reliability | Temperature Characteristics | Sinterability |
|---|---|---|---|---|---|---|---|
| 18 | 0.4 | 0 | 0.00 | Δ | X | ⊚ | ⊚ |
| 19 | 0.3 | 0.1 | 0.25 | Δ | X | ⊚ | ⊚ |
| 20 | 0.2 | 0.2 | 0.50 | Δ | X | ⊚ | ⊚ |
| 21 | 0.1 | 0.3 | 0.75 | Δ | X | ⊚ | ⊚ |
| 22 | 0 | 0.4 | 1.00 | Δ | X | ⊚ | ⊚ |

The above experimental results will be discussed below with reference to FIGS. 6A through 8B. In the examples (Sample Nos. 7-8 and 12-14 marked with "*") satisfying the content conditions of the rare earth auxiliary ingredient proposed in the present exemplary embodiment, that is, $0.10<Eu/(Dy+Eu)\leq0.50$ and $0.60\leq Dy+Eu\leq1.0$, both structural and electrical characteristics were good or excellent. As described above, it can be seen that the addition of both Eu and Dy is advantageous in improving electrical properties, but it is difficult to obtain desired characteristics unless a total content of Eu and Dy and a ratio between Eu and Dy are properly adjusted, and it is difficult to satisfy the temperature characteristics when the sum of Eu and Dy molar contents is more than 1.0 mol %, that is, 1.0 mole based on 100 moles of the $BaTiO_3$-based main ingredient. On the other hand, it can be seen that when amounts of Eu and Dy are very small, that is, when the sum of Eu and Dy molar contents is less than 0.60 mol %, that is, 0.60 moles based on 100 moles of the $BaTiO_3$-based main ingredient, the insulation resistance characteristics deteriorate. In addition, it can be seen that, even though the sum of Eu and Dy molar contents is 0.60 moles or more and 1.0 mole or less, when an $Eu/(Dy+Eu)$ value is 0.10 or less, high-temperature reliability deteriorates while permittivity is slightly improved as compared with that when Dy alone is added. When an $Eu/(Dy+Eu)$ value is more than 0.10, both the permittivity and the reliability characteristics can be improved. This is because oxygen vacancies are removed more effectively than those when Dy alone is added as described above. However, it was found that when an $Eu/(Dy+Eu)$ value is more than 0.50, permittivity decreased and an insulation resistance level decreased according to the semiconductorization of a part of a dielectric. Based on these results, an appropriate condition for $Eu/(Dy+Eu)$ may be set to $0.10<Eu/(Dy+Eu)\leq0.50$.

As set forth above, the dielectric composition according to an exemplary embodiment in the present disclosure is capable of improving structural and electrical characteristics, and improving reliability when used in a multilayer capacitor.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a dielectric layer and a plurality of internal electrodes stacked with the dielectric layer interposed therebetween; and
external electrodes disposed on the body and connected to the plurality of internal electrodes,
wherein the dielectric layer includes a dielectric grain,
the dielectric grain includes a $BaTiO_3$-based main ingredient and an auxiliary ingredient including rare earth elements, the rare earth elements include Dy and Eu, Dy and Eu molar contents based on 100 moles of the $BaTiO_3$-based main ingredient satisfy conditions of $0.10<Eu/(Dy+Eu)\leq0.50$ and $0.60\leq Dy+Eu\leq1.0$, and the rare earth elements do not include another element in a higher molar content than Dy and Eu, and
the dielectric grain has a core-shell structure including a core portion and a shell portion having a different composition from the core portion.

2. The multilayer capacitor of claim 1, wherein the rare earth elements are included in the shell portion.

3. The multilayer capacitor of claim 1, wherein the Dy molar content based on 100 moles of the $BaTiO_3$-based main ingredient satisfies a condition of $0.30\leq Dy\leq0.70$.

4. The multilayer capacitor of claim 1, wherein the Eu molar content based on 100 moles of the $BaTiO_3$-based main ingredient satisfies a condition of $0.10\leq Eu\leq0.50$.

5. The multilayer capacitor of claim 1, wherein the rare earth elements include only Dy and Eu.

6. A multilayer capacitor comprising:
a body including a dielectric layer and a plurality of internal electrodes stacked with the dielectric layer interposed therebetween, wherein the dielectric layer includes a dielectric grain including a BaTiO3-based main ingredient and an auxiliary ingredient including rare earth elements, the rare earth elements include Dy and Eu, Dy and Eu molar contents based on 100 moles of the $BaTiO_3$-based main ingredient satisfy conditions of $0.10<Eu/(Dy+Eu)\leq0.50$; and
external electrodes disposed on the body and connected to the plurality of internal electrodes,
wherein the dielectric grain has a core-shell structure including a core portion and a shell portion having a different composition from the core portion.

7. The multilayer capacitor of claim 6, wherein the Dy and Eu molar contents satisfy $0.17<Eu/(Dy+Eu)\leq0.50$.

8. The multilayer capacitor of claim 6, wherein the Dy and Eu molar contents satisfy $0.60\leq Dy+Eu\leq1.0$.

9. The multilayer capacitor of claim 6, wherein the rare earth elements do not include another element in a higher molar content than Dy and Eu.

10. The multilayer capacitor of claim 6, wherein the Dy molar content satisfies $0.30\leq Dy\leq0.70$.

11. The multilayer capacitor of claim 6, wherein the Dy molar content satisfies $0.30\leq Dy<0.50$.

12. The multilayer capacitor of claim 6, wherein the Eu molar content satisfies $0.10\leq Eu\leq0.50$.

13. The multilayer capacitor of claim 6, wherein the Eu molar content satisfies $0.20\leq Eu\leq0.30$.

14. The multilayer capacitor of claim 6, wherein the rare earth elements are included in the shell portion.

15. The multilayer capacitor of claim 6, wherein the rare earth elements include only Dy and Eu.

16. The multilayer capacitor of claim 6, wherein the shell portion includes the BaTiO$_3$-based main ingredient.

\* \* \* \* \*